United States Patent [19]

Young

[11] Patent Number: 4,682,999
[45] Date of Patent: Jul. 28, 1987

[54] METHODS FOR ENHANCING THE PRODUCTIVITY OF PLANTS

[75] Inventor: Donald C. Young, Fullerton, Calif.

[73] Assignee: Union Oil Company of California, Los Angeles, Calif.

[21] Appl. No.: 808,018

[22] Filed: Dec. 11, 1985

Related U.S. Application Data

[63] Continuation-in-part of Ser. No. 793,699, Oct. 31, 1985.

[51] Int. Cl.[4] .............................................. C05C 9/00
[52] U.S. Cl. ........................................ 71/28; 71/30; 71/65; 71/64.1
[58] Field of Search ................. 71/65, 28, 29, 30, 64.1

[56] References Cited

U.S. PATENT DOCUMENTS

| | | | |
|---|---|---|---|
| 3,185,731 | 5/1965 | Kaasenbrood | 260/555 |
| 3,232,964 | 2/1966 | Finneran | 260/555 |
| 3,251,879 | 5/1966 | Rosenbloom | 260/555 |
| 3,255,246 | 6/1966 | Singer, Jr. | 260/555 |
| 3,287,407 | 11/1966 | Zardi | 260/555 |
| 3,318,951 | 5/1967 | Kaasenbrood | 260/555 |
| 3,711,273 | 1/1973 | Mitchell | 71/120 |
| 3,860,411 | 1/1975 | Weakley | 71/119 |
| 3,903,158 | 9/1975 | Fuentes et al. | 260/555 B |
| 4,231,960 | 11/1980 | Schmidt | 564/73 |
| 4,345,099 | 8/1982 | Young et al. | 564/63 |

OTHER PUBLICATIONS

Takahashi et al., "Determination of Biuret in Urea by Ion Echange Resins," Soil and Plant Food, The Society of the Science of Soil and Manure, Japan, vol. 3, No. 3, Jan. 1958, pp. 142–144.
Mithyantha et al., "Biuret and Crop Production," Fertilizer News, Mar. 1977, pp. 13–18.
Starostka et al., "Greenhouse Evaluation and Nitrification Characteristics of Biuret and Urea–Biuret Mixtures," Agricultural Chemicals, Oct. 1955, pp. 49–50, and 104–105.
Strang et al., "Effects of Biuret on Pasture," Agricultural Gazette of New South Wales, vol. 72, Aug. 1961, pp. 424–425.
Terman et al., "Crop Response to Urea and Urea Pyrolysis Products," Agricultural and Food Chemistry, Auburn University, Auburn, Ala., vol. 12, No. 2, Mar.-Apr. 1964, pp. 151–154.
Smika et al., "Germination of Wheat as Affected by Biuret Contamination in Urea," Soil Science, vol. 84, 1957, pp. 273–282.
Hoffman, "Phytotoxicity of Biuret," Spencer Chemical Company, Chemical Research Department Report No. 1956-4, Feb. 7, 1956.
Hoffman "Phytotoxicity of Biuret," Spencer Chemical Company, Chemical Research Department Report No. 1956-20, Jul. 6, 1956.
Funabiki et al., "Studies on Biuret from Agricultural Standpoint: I Influences on Plant Growth," Matsuyama Agricultural College.
Scientific Reports, Matsuyama Agricultural College, Japan, No. 12, 1954, pp. 1–14.
Ogata et al., "Studies on Biuret from Agricultural Standpoint: II Stability of Biuret in Soil," Matsuyama Agricultural College Scientific Reports, Matsuyama Agricultural College, Japan, No. 12, 1954, pp. 15–22.
Ogata, "Biuret—Its Injurious Action on Crops," Chemical Abstracts, vol. 60, 2290(a), 1964.
Ogata et al., "Effects of Biuret on the Metabolism of Germinating Plants," Chemical Abstracts, vol. 59, col. 1967, 1963.

(List continued on next page.)

Primary Examiner—Ferris H. Lander
Attorney, Agent, or Firm—Michael H. Laird; Gregory F. Wirzbicki; Dean Sandford

[57] ABSTRACT

The productivity of plants is enhanced by enhancing one or more physiological responses of photosynthesizing plants by contacting the foliage of such plants during the early stages, i.e. about the first half, of the grand response period for the selected physiological response with a solution containing biuret in an amount and under conditions sufficient to introduce into the plant a non-phytotoxic amount of biuret sufficient to enhance the selected physiological response.

55 Claims, 1 Drawing Figure

OTHER PUBLICATIONS

Ogata et al., "Relation Between the Seedling Growth and Pretreatment of Seed with Biuret," Chemical Abstracts, vol. 51, col. 3809(b), 1962.

Ogata et al., "Seedling Growth and Biuret Supply in the Germinating Period," Chemical Abstracts, vol. 56, col. 7652(a), 1962.

Murphy et al., "Effect of Three Nitrogen Sources and Biuret on Yield and Specific Gravity of Katahdin Potatoes in Main," American Potato Journal, vol. 43, 1966, pp. 291-292.

Kitipov et al., "Study on the Toxic Effect of Biuret on Some Farm Crops," N. Pushkarov Soil Research Institute, Sofia, Bulgaria.

Mayr et al., "Plant Tolerance for Biuret in Urea," Biological Research Department Publication, Austrian Nitrogen Works, Linz, Austria, 1963.

Hunter et al., "The Effects of Urea, Biuret and Ammonia on Germination and Early Growth of Corn," Soil Science Society American Proceedings, vol. 30, 1966, pp. 77-81.

Gadat et al., "Research on the Toxic Effects of Biuret and on the Evolution of this Compound in the Soil," Ann. Agro., 6, 609, (1959).

Kilmer et al., "Crop Response to Biuret in Urea," Tennessee Valley Authority, National Fertilizer Development Center Bulletin Y-57, Apr. 1973.

Jones et al., "Urea Foliage Sprays," The California Citrograph, vol. 50, No. 9, Jul. 1965.

Robinson, "the Biuret Content of Urea for Foliar Application to Citrus," Department of Agriculture and Fisheries, Adelaide, S.A. 5001, Australia.

Sahrawat, "Effect of Biuret Content on Transformation of Urea Nitrogen in Soil," Soil Biology and Biochemistry, vol. 9, pp. 173-175, 1977.

Carles, "Physiological Study of Intoxication of Plants with Biuret," Comptes Rendus, 250, 1960, Paper presented at the Jan. 4, 1960 meeting at the laboratory of Plant Physiology, Catholic Institute, Toulouse, France.

Carles, "Contribution A: 'Etude du Mecanisme de l'Intoxication des Vegetaux par le Biuret," (Contribution to the Study of the Mechanism of Intoxication of Plants by the Biuret), Ann. Physio., Veg., 1, 1960, pp. 5-18.

Jurkowska, "Toxic Effect of Biuret on Plants as a Function of Soil Properties," Acta Agraria Et Silvestria, Series Agraria, vol. VII/1, 1967, pp. 3-21.

Jurkowska, "Reaction of Certain Varieties of Maize and Flax to the Toxic Effect of Biuret," Acta Agraria Et Silvesteria, Series Agraria, vol. VII/2, 1967, pp. 63-69.

Webster et al., "the Effect of Biuret on Protein Synthesis in Plants Physiology, vol. 32, 1957, pp. 60-61.

METHODS FOR ENHANCING THE PRODUCTIVITY OF PLANTS

BACKGROUND OF THE INVENTION

Related Applications

This application is a continuation-in-part of my copending application Ser. No. 793,699 filed Oct. 31, 1985 for CONIFER GROWTH STIMULATION AND FOREST MANAGEMENT.

Field of the Invention

This invention relates to the field of plant productivity enhancement, and, in particular, it relates to methods for improving the productivity of plants especially by enhancing one or more physiological responses of such plants.

Introduction

The growth response of plants, and for that matter the growth response of essentially all life forms, generally follows what is known as the grand growth (response) curve such as that illustrated in FIG. 1 as curve number 1. Such characteristic growth curves are usually employed in reference to the rate of increase of plant weight or height with time as discussed in the Western Fertilizer Handbook, 5th Edition, Soil Improvement Committee, California Fertilizer Association, Interstate Printers and Publishers Inc., Danville, Illinois at Chapter 3. However, these characteristic sigmoid (S-shaped) curves are also known to illustrate the corrolation of response rate with time for a variety of physiological responses and for essentially all major physiological responses of plants. As observed by Meyer and Anderson, Plant Physiology D. Van Nostrand Company, Inc., 1939, Chapter 31, every plant cell, and hence every coordinated group of cells, undergoes a cyclic change in the rate of enlargement during its growth period which follows the general sigmoid shape of the grand growth curve, and such sigmoid curves of growth are characteristic of a wide variety of growth phenomena. That the growth pattern represented by the sigmoid growth curve is a universal pattern of growth behavior is demonstrated by the fact that such growth patterns are exhibited by diverse types of growth phenomena such as the rate of elongation of segments of the root axis, the rate of elongation of segments of the stem axis, the expansion of leaves, the increase in weight of fruits, the growth of annual plants expressed in terms of dry weight increment, and even the growth (i.e., increase in population) of microorganisms. Enviromental factors may influence the length of time required for completion of the grand growth period and, in extreme cases, may cause complete cessation of growth thereby interrupting the characteristic cycle. Thus, the magnitude of growth in a given plant may very greatly in accordance with prevailing enviromental conditions such as water and nutrient availability and sunlight. However, the relative rate of growth at any time during the growth period normally bears a definite relation to the relative growth increment which has already occurred and which may be expected to occur subsequently. That the agricultural community has appreciated the influence of enviromental factors on plant growth is amply demonstrated by the wide use of irrigation and fertilizers and by the location of the most productive agricultural fields (for most plant varieties) in areas that receive ample sunlight.

Plant growth regulants afford a means of modifying the response of plants at one or more stages of development in respects other than those that can be influenced by enviromental factors such as nutrient and sunlight supply. Plant growth regulants can be defined as compounds and/or preparations which, in minute amounts, alter the behavior of ornamental and/or crop plants and/or the produce of such plants through physiological (hormonal) rather than physical action. They may either accelerate or retard growth, prolong or break a dormant condition, promote rooting or fruit-set, increase fruit size or quantity, or affect the growth and/or productivity of plants in other ways. Plant growth regulants are currently classified into one or more of six categories: auxins, gibberellins, cytokinins, ethylene generators, inhibitors, and retardants. Illustrative of known auxins are indole acetic acid, 2,4-D (2,4-dichlorophenoxyacetic acid), MCPA (4-chloro-2-methyl phenoxyacetic acid), MCPB (4-[(4-chloro-o-tolyl)oxy]butyric acid) which susceptible plants oxidize to MCPA, and BNOA (beta-napthoxyacetic acid). Gibberellins include gibberellic acid and its derivatives, while cytokinins include compositions such as zeatin, kinentin, and benzyl adenine. Presently known ethylene generators include ethylene and Ethephon [(2-chloroethyl) phosphonic acid]. Presently known inhibitors include benezoic acid, gallic acid, and cinnamic acid, while retardants, a recently developed class of plant growth regulants, include compositions which are especially useful in plant height control, particularly in commercial greenhouse-grown floricultural crops.

These known growth regulants have in common the characteristic that they promote a response in plants that would not otherwise occur. They do not typically enhance the plant's ability to carry out a normal response such as fruit production. Thus, neither control of the enviroment by irrigation, fertilization nor the modification of normal plant physiological behavior by growth regulants can overcome all of the limitations imposed on plant productivity, many of which are genetic. For instance, as reported by Meyer and Anderson, supra, in Chapter 34, when tomato fruits are allowed to remain on the plant and enlarge, vegetative development and flower production gradually slow as more and more fruit develop. The inhibition of development in the plant proceeds approximately in the order: (1) loss of fecundity by the blossoms, (2) decrease in the size of floral clusters, (3) abscission of flower buds, (4) checking and later cessation of terminal growth of the stem and (5) eventual death of all parts of the plant except the fruit. The checking effect on fruit enlargement upon continued vegetative development and on the development of flowers results from the virtually complete monopolization of nitrogen in the plants by the developing fruits. Removal of fruits at any time before the vegetative parts die results in the renewal of vegetative growth and, ultimately, another cycle of reproductive development. Development of flowers often inhibits vegetative growth, while fruiting may inhibit both further flowering and vegetative growth. According to Meyer and Anderson, this type of correlative development is demonstrated by a variety of plant species and apparently is due to the great nutrient demands placed on the plant by the occurrence of a characteristic physiological response such as flowering, fruiting, fruit development, etc. Most if not all of these growth correlations are usually explained in terms of the internal food relations of plants, and they are believed to result from a diversion of such a large proportion of the available food supply to developing flowers or fruits that other organs suffer a deficiency and hence are checked in growth. Both developing flowers and fruits are organs of high assimilatory and respiratory activity, and hence their maturation may result in a considerable drain on available food and energy supplies. Such high nutrient demands are even more characteristic of plant species developed for high productivity. The nutritional demand of such plants typically cannot be met simply by adding more fertilizers or irrigation water.

That such normal limitations on maximum plant response development could be remedied by the addition of biuret seems unlikely. Biuret is known to be highly phytotoxic to essentially all plant varieties when applied in a manner which provides direct contact with either plant foliage or roots. Biuret applied to the soil of deep rooted plants is generally less toxic since it is only slightly soluble in water (less than 2 weight percent at 25° C.), is strongly adsorbed by clay particles, and is generally degraded in the soil before it can be assimilated by the plant. However, application of biuret directly to plant foliage is known to produce dramatic phytotoxic responses and often results in plant stunting or death. Many authorities flatly state that the biuret content of foliarly applied urea should not exceed 0.25 weight percent. See, for instance, the "Farm Chemicals Handbook," Meister Publishing Company., Willoughby, Ohio, 1981 under "Urea" and "LB Urea", and the "Western Fertilizer Handbook", supra, page 163.

The phytotoxicity typically associated with biuret depends upon the direct entry of that compound into the plant; thus it depends on the manner of application. For instance, if biuret is applied to the soil, it is generally nitrified before entering the plant roots due to its low mobility (low water solubility and high adsorptivity) and rapid nitrification in soils. As discussed by Starostka and Clark in "Greenhouse Evaluation and Nitrification Characteristics of Biuret and Urea-Biuret Mixtures," Agricultural Chemicals, October, 1955, pages 49–50 and 104–107, biuret nitrification proceeds almost as rapidly as the nitrification of urea in the soil. Such nitrification not only negates any potential phytotoxicity of biuret (since the biuret is converted to non-toxic forms), it also creates nutrient nitrogen (nitrate) which can have an obvious beneficial effect on normal plant responses. Due to biuret's low mobility in the soil and high nitrification rate, soil application of biuret generally results only in addition of nitrate nitrogen to the plant in all but the most porous, sandy soils, with the expected beneficial effect of nitrate nitrogen. This effect, in all likelihood, accounts for the benefits, if any, realized by soil application of biuret and reported in publications such as U.S. Pat. No. 3,860,411 to Weakley. Application of biuret to plant foliage even at very high rates is not necessarily phytotoxic, particularly if the biuret is not dissolved. Undissolved biuret does not enter plant foliage, at least not at any significant rate, and the application of biuret powders to plant foliage as described by Weakley, supra, results only in addition of biuret to the soil under the great majority of enviromental conditions. In order for dry biuret on plant leaves to enter the plant, it must first be dissolved, and the application of adequate water to accomplish that result would most likely wash the biuret from the plant foliage unless it is very carefully applied by misting or similar means. Reports of beneficial effects of biuret application to plants in yet other publications are confused by factors beyond the fertilizer, immobility and adsorption aspects already discussed. For instance, while some of the inhibiting correlative effects of plant response discussed by Meyer and Anderson appear to be due to virtual monopolization of nitrogenous foods by the dominant organs, i.e. flowers or fruits, yet others appear to be due mainly to the diversion of carbohydrate foods to such organs. (Meyer et al, page 618–619) It is well known that plant injury, either physical or chemical (poisoning), dramatically increases plant respiration. This response is the result of factors such as the high metabolic activity required to repair a physical wound or metabolize or otherwise expel a toxic chemical. Meyer and Anderson observe at page 526 that the increased respiration of injured plant parts (potato tubers) following wounding is correlated with an increase in sugar content of the tuber. Furthermore, a reduction in internal water content of plants is known to correlate with the conversion of starch to sugar and that the presence of potentially phytotoxic compounds such as biuret can result in plant wilting. Meyer and Anderson observe at page 387 that much of the starch present in wilting leaves is digested to sugars, that sucrose accumulates as well as simple sugars during the wilting process, and that many plant species accumulate sugars rather than starch under drought conditions, the latter of which is known to result in lower internal water content. Thus, lower internal water content, whatever its cause, is known to induce the conversion of carbohydrates to soluble carbohydrates such as sugars. The application of a potentially phytotoxic compound such as biuret at high dosage rates such as 100 pounds per acre to sugar-producing plants, e.g. sugar beets, as discussed by Weakley, supra, may very well be the result of high plant respiration induced by the toxic material provided the biuret enters the plants. Biuret foliarly applied at a rate of 100 pounds per acre to sugar beets is definitely phytotoxic assuming a substantial proportion of the material enters the foliage. While an increase in the sugar content of plants at the expense of other normal plant functions due to phytotoxic poisoning may be a desirable objective in some instances, it is not the ideal when an overall productivity increase is desired.

SUMMARY

It has now been discovered that selected, normal physiological responses of photosynthesizing plants can be enhanced, without inhibiting other normal plant responses, by contacting the foliage of the plants during the first one half of the grand response period for the selected physiological response with a solution containing biuret in an amount and under conditions sufficient to introduce into the plants a non-phytotoxic amount of biuret sufficient to increase the selected response. These methods can be employed to enhance a variety of normal plant responses without detriment to other growth characteristics. Thus, they can be employed to enhance blossom set, fruit set (including cotton boll set), fruit and cotton growth, grain-head filling, root crop development (growth), sugar accumulation during the sugar accumulating stage in sugar-producing plants, and vegetative growth. The response enhancement achieved by these methods is substantially greater than the nitrogen fertilizer effect realized by application of equivalent amounts of nitrogen fertilizers such as urea, and it is achieved without inducing phytotoxic symptoms in the plants. The compositions employed in these methods are non-toxic to the enviroment and, ultimately, result only in addition of nitrate nitrogen to the plants and soil. They introduce no toxic residue into plants since biuret is rapidly metabolized both in the soil and in plants. The methods do not inhibit or otherwise interrupt the normal physiological development of plants as is the case with many known plant growth regulants and toxic materials. Supportive vegetative growth, plant shape and growth pattern, and fruit shape and size are maintained in normal proportions to each other. Since the biuret is applied to the foliage as a solution from which it can be readily assimilated into the plant, it is efficiently used by the plant as biuret rather than as a nitrate nitrogen fertilizer (formed by nitrification either in the soil or on plant foliage). Furthermore, since biuret is applied only at non-phytotoxic levels, an improvement in one aspect of plant response, such as sugar production, is not achieved at the expense of other normal plant functions such as vegetative growth, fruit enlargement, and the like.

Without intending to be limited to any particular theory or manner of operation, it appears that the introduction of minor, non-phytotoxic quantities of biuret directly into plants, as is achieved in these methods, enables an increased level of photosynthesis and/or a greater photosynthetic efficiency, possibly along with enhanced assimilation of nutrients. The conversion of carbon dioxide and water to carbohydrates, photosynthetically or otherwise, is very unfavorable thermodynamically. Thus, the photosynthesis of carbohydrates, a process essential to plant growth, is a very high energy process, and the demands on the photosynthesizing ability of plants are large, particularly during the maximum development stage for a given plant response such as blossom set, fruit set, fruit development, etc. It is believed that the methods of this invention may stimulate the photoenergy transport process in plants essential to photosynthesis and the manufacture of carbohydrates and/or improve the utilization of stored carbohydrates such as starches, sugars and glycogen, particularly during the maximum energy demand stages of plant response. Thus, they enable the plant to proceed at a maximum rate of development for the selected response without inhibiting or checking other responses. For instance, treated plants can provide sufficient energy in the form of carbohydrates to support fruit development without checking further flowering as is typically the case with tomatoes and other fruiting plants.

DETAILED DESCRIPTION

Figure 1:
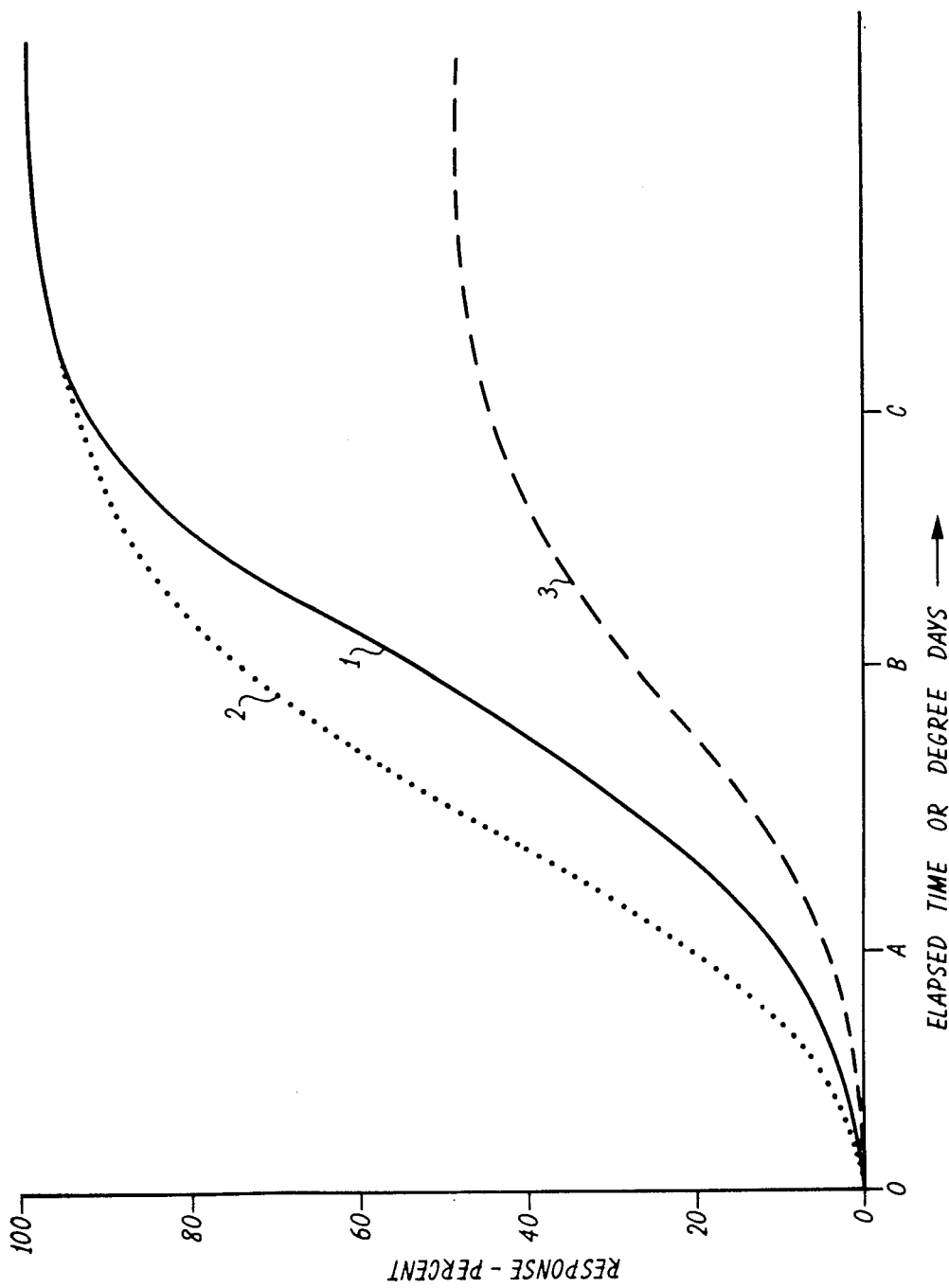
FIG. 1 illustrates a characteristic sigmoid response curve for an adequately nourished plant response (1), the corresponding nutrient demand curve for the same plant response (2), and a sigmoid response curve for the same response in undernourished or inhibited plants of the same species (3).

A normal, selected physiological response of photosynthesizing plants is enhanced by contacting the foliage of the plants during about the first half of the grand response period for the selected physiological response with a solution comprising biuret in an amount and under conditions sufficient to introduce into the plants a non-phytotoxic amount of biuret sufficient to enhance the selected response. Plant responses of particular interest include blossom set, fruit set (including boll set in cotton), fruit growth (including cotton boll growth), grainhead filling in grain and seed plants, root development in root crops, sugar accumulation in sugar accumulating plants, and vegetative growth. Two or more of such responses can be enhanced in the same plants by treating the plants with biuret solutions as described during about the first half of the response period for each of the desired responses.

The characteristic, cumulative growth pattern for essentially all plant cells, and hence all plant organs, is represented by a characteristic sigmoid curve illustrated generally as curve 1 in FIG. 1. The same type of response applies to the function of cells and organs such as the production of carbohydrates, sugars, protein and other plant organ products. Thus, FIG. 1 illustrates the correlation between the percent of the observed response which has occurred (on the ordinant) with elapsed time or degree days on the major abscissa. Cumulative degree days are typically used as a more accurate indicator than time as a predictor of plant response, and they are usually evaluated by monitoring soil temperature at a depth of approximately 6 inches (roughly corresponding to root zone depth) and cumulatively adding the degree days from planting, emergence, or other characteristic occurrence such as blossom set, fruit set, etc. Cumulative degree days generally correlate well with time for areas of similar climate and solar insolation (quantity of incident sunlight received by soil or foliage). Data from which such response curves can be derived for a wide variety of plants and plant responses have been obtained and are available from state and federal agencies such as the U.S. Department of Agriculture, the California Department of Food & Agriculture, and other sources.

As illustrated by curve 1, response rate, i.e. vegetative growth, grain-head filling, etc., proceeds gradually at first and then accelerates rapidly at about point A (after approximately 10 percent of response development) to a maximum response rate at 40 to 60 percent of response occurrence (represented generally by time B). Response rate in the typical sigmoid response curves is represented as the rate of change of the monitored response with time or degree days. Response rate begins to diminish after about 70 to 80 percent of the response has occurred and tapers off to a nominal rate as 100 percent of the response is approached.

Curve 2 in FIG. 1 represents the rate of change of nutrient and photosynthetic energy demand required to support a response which varies in rate as represented by curve 1. Nutrient and/or photosynthetic energy demand leads response demand as might be expected in view of the fact that energy and nutrients are required within the plant in order to enable the response to occur.

Curve 3 is a response curve for the same response in a stressed or undernourished plant which is unable to perform to its maximum genetic capability with regard to the selected response due to stress or limited supplies of nutrients, water, and/or sunlight. Such diminished response also can be due to the plants "anticipation" that its nutrient supply will be insufficient to support the ultimate consequences of a higher rate and/or degree of response. For instance, a wide variety of flowering-fruiting plants abort flowers (primordial fruit) in response to internal signals that nutrient supply or other factors are not capable of supporting the fruit that would result from setting more blossoms, even though the plant may be able to support the blossoms themselves. Such signals and consequent abortion of reproductive organs are known to be a survival response which enables plants to "project" future energy and nutrient requirements and to abort reproductive organs such as blossoms and fruit or grain in any growth stage in order to retain only those organs which can be supported to reproductive maturity by the available energy and nutrient supplies.

Obviously the highest possible response rates are generally preferred. However, the maintenance of such maximal response rates requires not only the availability of adequate nutrients and energy (curve 2) but also requires the plants ability, including "anticipated" ability, to assimilate such nutrients and energy sufficiently rapidly to support the maximal response rate. Such conditions generally are difficult to achieve, particularly with highly productive plants which have been genetically bred to maximize their optimal production levels.

It has now been found that the introduction of biuret into the plant shortly before or during the period of its maximum nutrient and/or photosynthetic energy demand either enables the plant to assimilate and utilize nutrients and energy at a faster rate and/or attenuates the plant's normal abortion response that would otherwise occur in the absence of biuret, and this effect enables the plant to develop the selected response or responses to a greater extent. Since the maximum nutrient and energy demands (curve 2) occur approximately between about 10 percent and 60 percent of response occurrence, it is necessary to provide for the presence of biuret in the plant during or shortly before those time frames. This necessity, combined with the fact that biuret is rapidly metabolized in plants, makes biuret application timing critical for the occurrence of optimum results. Biuret is essentially completely metabolized in the great majority of plants within 3 days of application (provided that it is applied to the plants in a solution form which is readily assimilated). A major portion of biuret is metabolized within 1 or 2 days. Since excessive concentrations of biuret cannot be applied (in assimilatable forms) without phytotoxic effects, the "window" available for achieving maximum response by biuret application is relatively narrow. Thus, as a general rule, it is essential to monitor or anticipate the occurrence of the selected physiological response and apply biuret to the plant foliage within about the first half of the selected response period. Usually this can be achieved by applying biuret solutions within a period of about 3 days before initiation of response to the time at which about 50 or 60 percent of the response has occurred.

These methods can be employed to enhance one or more responses of all varieties of photosynthesizing plants including all varieties of vegetative, flowering and fruiting plants. Illustrative of such plants are all varieties of fruiting plants; fruiting, leafy and root vegetables; fiber crops; grain crops; grasses; deciduous and perennial trees, vines and shrubs; conifers; and ornamental and flowering plants including shrubs and trees. Illustrative fruiting plants are bananas (including bananas and plaintains), citrus fruits (including grapefruits, lemons, limes, oranges), tangelos, tangerines, kumquats and hybrids of these; cucurbits including cantalopes, casabas, crenshaws, cucumbers, honeyballs, honeydew melon, melon hybrids, muskmelons, persian melons, pumpkins, summer squash, watermelons and hybrides, and winter squash; pome fruits including apples, crabapples, pears, and quinces; small fruits including blackberries, blueberries, boysenberries, cranberries, currents, dewberries, elderberries, gooseberries, grapes (including varietal and table grapes and raisins), huckleberries, loganberries, raspberries, stawberries, and youngberries; and stone fruits including apricots, cherries (sour and sweet), damsons, nectarines, pawpaws, peaches, plums, prunes, avocados and the like. Illustrative vegetables include fruiting vegetables such as eggplants, peppers (including pimentos and bell, hot, and sweet pepper), pimentos, and tomatoes; leafy vegetables including anise, broccoli, brussel sprouts, cabbage, cauliflower, celery, chinese cabbage, collards, dandelion, escarole, fennel, kale, kohlrabi, lettuce, mustard greens, parsley, rhubarb, spinich, swiss chard, and water cress; root crop vegetables such as beets, carrots, chicory, garlic, green onions, parsnips, potatoes, radishes, rutabagas, salsify, shallots, spring onions, sugar beets, sweet potatoes, turnips and yams; and seed and pod vegetables including blackeyed peas, cow peas, dill, soybeans, field beans, field peas, garden peas, garden beans, kidney beans, lima beans, navy beans, okra, pole beans, snap beans, string beans, wax beans and lentils. Illustrative grasses include decorative grasses such as bluegrass, rye grass, hybrids and the like, pasture and range grasses and grasses grown for hay or silage, sorghum grown for hay or silage, and small grains grown for hay, grazing or silage. Illustrative of commercially grown forage legumes include all crops of the family leguminosae including alfalfa, clovers, cow peas (grown for hay), lespedezas lupines, and trefoil. Closely related to fruit crops (with respect to methods) are nut crops including almonds, brazil nuts, bush nuts, butter nuts, cashews, chestnuts, filberts, hazelnuts, hickory nuts, macadamia nuts, pecans and walnuts. Illustrative grain crops include all crops belonging to the family graminae that produce mature seed such as barley, buckwheat, corn (field corn, sweet corn, popcorn), millet milo, oats, rice, rye, sorghum (grain), and wheat. Illustrative fiber crops include cotton and flax.

These methods can also be employed to enhance the growth of decorative deciduous and perennial trees, vines and shrubs including wood crops such as oak, elm, maple, walnut, spruce, hemlock, alder, loblolly pine, redwood, mahogany, cypress, cedar, douglas fir and white pine. Illustrative of commercially grown flowering plants are all varieties of orchids, roses, chrysanthemums, azaleas, camellias, carnations, pansies, snapdragons, and numerous other varieties.

The methods are particularly useful for enhancing the productivity of plants which have one or more distinct, relatively short term high energy demand responses during their growth cycle such as a flowering or fruiting response. Such plants include all varieties of ornamental and fruit, grain, vegetable and fiber crop plants which flower during their life cycle and plants which bear fruit including fruiting vegetables, grain and fiber crops such as cotton. Treatment of flowering plants enhances blossom set, retention and maturation, while treatment of grain bearing, fruiting and fiber producing plants increases fruit set, retention, growth and maturation.

The useful solutions contain sufficient biuret to enhance the selected plant response dissolved in water or other solvents, and they optionally may contain surfactants, plant nutrients and/or growth adjuvants or regulators. Typically, the biuret concentration in the solutions is sufficient to account for at least about 0.5, generally at least about 1, and preferably at least about 2 percent of the total nitrogen present in the composition. Higher biuret concentrations are generally preferred, particularly when lower total nitrogen dosage rates are desired as is the case when nitrogen availability is already sufficient to support adequate growth. Thus, biuret concentration usually corresponds to at least about 5, preferably about 10 to 100, and most preferably about 20 to 100 percent of the total nitrogen present in the solution. Most often, biuret will account for about 2 to about 100 percent of total nitrogen. The most preferred solutions are those in which the nitrogen content in the solution consists essentially of biuret. Expressed on the basis of absolute biuret concentration, the solutions generally contain at least about 0.05, typically at least about 0.1, and preferably at least about 1 weight percent biuret dissolved in water and/or other solvent. The most useful biuret concentrations are typically within the range of about 0.1 weight percent to the biuret solubility limit under application conditions. Undissolved biuret is undesirable since it cannot be readily assimilated by plant foliage; thus dosage rate cannot be adequately controlled. Since biuret is more soluble in concentrated urea solutions, and its solubility increases as temperature is increased, higher biuret concentrations can be achieved by employing relatively concentrated urea solutions, i.e. solutions containing about 10 to about 60 weight percent urea and elevated temperatures, i.e. up to about 60° C. Such biuret-containing urea solutions are useful for supplementing the plant's nitrogen supply to an extent beyond that which can be achieved by biuret alone without reaching phytotoxic dosage levels. The most preferred compositions are aqueous solutions which have biuret/urea weight ratios of at least about 0.02, generally at least about 0.05, preferably at least about 0.1 and most preferably at least about 0.5. The most preferred compositions are those in which the total nitrogen content consists essentially of biuret. The higher biuret/urea weight ratio compositions are particularly preferred when low total nitrogen dosage rates are desired.

Surfactants and/or polar solvents other than water facilitate foliage wetting and solution distribution and thereby promote rapid assimilation of biuret (and other dissolved components if present) by plant foliage. Relatively minor surfactant concentrations are usually sufficient and correspond to at least about 0.1 weight percent, generally about 0.1 to about 2.5 weight percent, and typically about 0.25 to about 1 weight percent. Similar or higher concentrations of polar solvents other than water can be employed. Thus, the biuret (and other components when present) can be dissolved in water containing 0.5 weight percent of a polar solvent other than water, or the solvent can consist essentially of a polar solvent other than water. Illustrative polar solvents include aldehydes such as formaldehyde, propionaldehyde, etc.; ketones such as methylethylketone; alcohols such as isopropanol; organic acids such as acetic, butyric and propionic acids; amines, amides, thiols, and other polar compounds and combinations of such compounds. A variety of surfactants is useful in these solutions, including cationic, anionic and nonionic surfactants and combinations of these. Illustrative classes of suitable surfactants are fatty amines, alkarylamines, fatty amides, quaternary alkyl and aryl ammonium salts and hydrates, quaternary ammonium bases of fatty amines and disubstituted diamines, fatty acid sulfonates, sulfonated fatty amides, amides of amino sulfonic acids, alkylaryl sulfonates and the like. Illustrative nonionic surfactants include polyethylene oxide condensates with hydrophobic groups having reactive hydrogens. These hydrophobic groups can have from about 8 to about 25 carbons and from about 2 to 15 molecular weights of the hydrophilic group. The hydrophobic groups can be selected from a variety of organic compounds having one or more reactive hydrogens including fatty alkyl or alkenyl alcohols, fatty acids, amines and amides, esterified hexitans or alkenyl phenols. The hydrophilic groups can be ethylene oxide moieties or groups such as ethylene chlorohydrin or polyethylene glycol. Still other illustrative surfactants include the organic substituted ammonium salts of sulfodicarboxylic acids that are reacted with various hydrophobic groups such as fatty amides having 12 to 18 carbon atoms to produce half amides in the manner described in U.S. Pat. No. 2,976,209 the disclosure of which is incorporated herein in its entirety. Other materials of this type are described in U.S. Pat. Nos. 2,976,211, 3,080,280 and 2,976,208, the disclosures of which are incorporated herein by reference in their entireties.

The biuret-containing solutions can be obtained by dissolving biuret and other components, if present, in water and/or other solvents. Surfactants, polar solvents other than water, nutrients, insecticides, etc., can be added in any order of mixing. Biuret can be obtained by any one of a variety of procedures including pyrolysis and selective crystallization as disclosed by Shipley and Watchorn in British Pat. No. 1,156,099 and by Kaasenbrood in U.S. Pat. No. 3,185,731, the disclosures of which are incorporated herein in their entireties. Particularly useful methods for obtaining biuret from urea are disclosed by James A. Green II and Donald C. Young in Ser. No. 753,692 filed July 10, 1985 for Methods for Removing Biuret from Urea by Adsorption, Ser. No. 753,693 filed July 10, 1985 for Biuret Purification, Ser. No. 732,175 filed May 7, 1985 for Biuret Manufacture, and Ser. No. 725,304 filed Apr. 19, 1985 for Methods for Purifying Biuret.

The selected response of photosynthesizing plants is enhanced by contacting the foliage of the plants during about the first half of the response period for the selected response with the useful biuret-containing solutions and under conditions sufficient to introduce into the plants a non-phytotoxic amount of biuret sufficient to enhance the selected response. For the reasons discussed hereinabove, the timing of application is critical, particularly since biuret is rapidly metabolized in plants, and the energy and nutrient demands on the plants can increase very rapidly, particularly during flowering, fruit bearing, grain-head filling, cotton boll or tuber growth, and fruit maturation (sugar accumulation etc.). Generally, significant advantage is realized by introducing biuret into the plants between about the commencement of the involved response period up until approximately 90 percent of the response has occurred and usually within the period between the occurrence of about 10 and about 90 percent of the involved response. Best results are obtained when biuret application is timed to provide for the presence of biuret in the plants within the period between commencement of the response and the occurrence of about 60 percent of the response, and preferably before about one half of the response has occurred. Most preferably, application timing is sufficient to provide for the presence of biuret in the plant within the period in which about 10 to about 50 percent of the involved response has occurred. These ranges represent those in which the highest nutrient energy demands are imposed on the plant. Since approximately 24 hours (1 diurnal cycle) is usually required for complete assimilation of biuret applied to the foliage, and the great majority of biuret is metabolized within the plant in about 3 days, it is usually desirable to apply the solutions within about 1 to about 3 days before the time of highest nutrient/energy demand in order to assure the presence of biuret in the plant when that demand occurs.

The time of onset of any physiological response of any species of plant can be determined from analyses of the plants during the growth cycle, and much of this information has already been obtained and is available for many varieties of physiological response and species of plants from the United States Department of Agriculture and various state agencies such as the California Department of Food & Agriculture in Sacramento, Ca. Of course, rates of vegetative growth and other physiological responses can be determined by observation and testing either of the plants to be treated or of a sample plot of plants of the same species. Thus, the rate of photosynthesis can be determined by lysimeter studies and gas analyses and/or by periodic tissue analyses as described by Meyer and Anderson, supra, at pages 324 through 326, the disclosure of which is incorporated herein in its entirety. Similarly, the stage of plant growth and the rate of change of any given physiological response can be determined by quantifying the stage and rate of development by one or more means such as measuring height or length of stems or plants, dry weight determinations, blossom and fruit counts, fruit size measurements, sugar and/or protein analyses, etc. Thus, the sigmoid growth curve for any species of plant, i.e. the rate of growth with time (or degree days), can be determined by periodically, e.g. daily, measuring the height or weight of the plants in question. Dry weight can be conveniently determined by sacrificing the above ground, below ground or total plant and drying for about 24 hours at 60° C. Sigmoid response curves for blossom set, fruit set and cotton boll set can be obtained by periodically counting the number of blossoms, fruit or bolls which have set on sample plants, and response curves for fruit or cotton boll growth, grain-head filling, root crop growth, etc. can be derived by periodically sampling the subject plant parts, weighing the representative samples, and plotting the results versus time or degree days. Rates of sugar and protein accumulation versus time, and the stage of development of each of those responses for a given species of plant can be determined by periodic sugar or protein analyses. Such analyses are currently employed to determine the stage of development of various fruits and vegetables such as grapes and tomatoes. Grapes are typically analyzed for sugar content (brix) and tomatoes and other fruits are typically analyzed to determine stage of ripening and sugar accumulation by hand refractometer.

As a general rule, the biuret-containing solutions are applied to the plant foliage during (or shortly before) the maximum energy-nutrient demand period for the plant response in question, which usually corresponds to about the first half of the grand response period for the selected physiological response. General rules of thumb can be observed for most physiological responses in a variety of plants. Thus, flowering response can be maximized by applying the solutions within a period of about 3 days before to about 3 days after first bloom, with applications within about 1 day (either before or after) of first bloom being particularly preferred. Many plants, particularly crop plants, bloom rapidly once the bloom stage has initiated as is amply demonstrated by the blossoming of cherry trees which often seems to occur "overnight." Root crops are typically treated within the first half of root crop development (determined by root crop weight), while the fruit bearing response of fruiting plants can be enhanced by treatment within a period of about 3 days before fruit set up until the fruit are approximately one half full size. Significant enhancement of the number and size of fruit in many fruit-bearing plants can be achieved by treatment within a period of about 3 days before to about 1 week after first fruit set. Enhancement of seed or pod vegetable production can be achieved by application of the useful biuret-containing solutions within a period defined by abbut the first one half of growth of the seed or pod, while grain-bearing plants are typically treated within a period of about 3 days before to about 10 days after commencement of the grain-head filling response. Similarly, cotton production can be increased by treatment within about 3 days before to about 10 days after first boll set. Forage grasses such as hays and alfalfa which are periodically cut and allowed to regrow are advantageously treated within a period of about 2 to about 10 days after cutting, and particularly when the crop has realized about 2 to about 4 inches of regrowth. Decidious trees, shrubs and vines benefit from treatment in the spring within a period beginning with first leaf emergence to about 2 weeks after first leaf emergence. Multiple treatments are also beneficial provided that sufficient time, e.g. about 3 days, is allowed between treatments to prevent accumulation of phytotoxic biuret levels. Thus, plants can be treated two or more times during the response period for each of the above referenced responses. Examples of optimum application timing for several crops are as follows: cut alfalfa—after 2 to 4 inches of regrowth; barley—at first flowering; beans—in the early stages of flowering after about 5 to 10 percent of the flowers have blossomed; cotton—when bolls are approximately walnut size; potatoes approximately 40 days prior to harvest; sugar beets—about 40 to 50 days prior to harvest (to maximize beet production and sugar content); tomatoes—shortly before first flowering to about 3 days after first flowering and again wheh fruit are approximately walnut size; wheat—at first heading; conifers—in the spring during bud break and periodically thereafter; grapes—when the fruit are about 'BB' size.

Even very minor amounts of biuret enhance plant response provided that the phytotoxic limit is not exceeded. Typically, however, application rates of the useful solutions correspond to biuret dosage rates of at least about 1 ounce per acre, generally about 1 ounce to about 30 pounds per acre. Adequate responses can generally be achieved at dosage rates well below 30 pounds per acre; thus solution application rates will usually correspond to biuret dosages of about 1 ounce to about 20 pounds per acre, preferably about 1 ounce to about 10 pounds per acre, and most preferably about 1 ounce to about 5 pounds per acre. Dosage rates of about 1 ounce to less than 10 pounds per acre are particularly preferred and generally provide maximum responses in fruiting crops, leafy and root vegetables, fiber crops, grain crops, and ornamental flowering plants.

The solutions can be applied by hand-held sprayers or by mechanical spraying from land vehicles, or they can be aerially applied to helicopter or other aircraft. The quantity of solution applied will generally be determined by the selected solution concentration and total biuret dosage rate. Typical application rates correspond to about 15 to about 200, and preferably about 25 to about 100 gallons of solution per acre. The quantity of solution applied should be sufficient to adequately distribute the biuret over plant foliage without excessive drainage from the foliage to the soil since, as mentioned above, little if any benefit is achieved by applying biuret to the soil or in undissolved form.

The invention is further described by the following examples which are illustrative of specific modes of practicing the invention and are not intended as limiting the scope of the invention as defined by the appended claims.

EXAMPLE 1

Biuret is foliarly applied to tomato plants when the largest fruit reaches walnut size at rates corresponding to 5, 10 and 15 pounds of biuret per acre by spraying with an aqueous solution containing about 1.5 weight percent biuret through a hand-held sprayer. The spray volume is not sufficient to produce any significant runoff. There are four replicates of each test in addition to four replicate untreated plots arranged in randomized complete blocks. The tomatoes are allowed to ripen, and are harvested and weighed. Productivity results are averaged to obtain means for the four replicates of each treatment, and are normalized in relation to the untreated plots to obtain an untreated control value of 1.00.

EXAMPLE 2

The test described in Example 1 is repeated with the exception that the 15 pound per acre biuret rate is omitted. Again there are four replicates of each treatment including an untreated control, and results are averaged and normalized to obtain a control value of 1.00. The results of Examples 1 and 2 are averaged to provide a more statistically significant illustration of the biuret dosage rate effect, and those results are reported in Table 1.

TABLE 1

| Biuret, Lb./@ | Relative Yield | Relative Yield Change, % |
|---|---|---|
| 0 | 1.00 | |
| 5 | 1.12[b] | +12 |
| 10 | 0.95[b] | −5 |
| 15 | 0.92[a] | −7 |

[a] One set of four replicates.
[b] Two sets of four replicates each

As illustrated in the table, the 5 pounds biuret per acre rate increases yield by 12 percent which represents average increased yields to tomato growers of $100.00 to $200.00 per acre. This result is statistically significant at greater than 90 percent confidence. The 10 pound per acre biuret rate significantly decreases tomato production, and the 15 pound per acre rate apparently decreases production even further in comparison to the untreated control.

EXAMPLE 3

Cotton plants are treated at peak flowering (maximum blossom set) by foliar application of aqueous solutions of biuret containing about 0.05, and 0.1 pounds of biuret per gallon at rates corresponding to 5 and 10 pounds of biuret per acre, respectively. Four replicates of each trial are provided along with four replicate untreated control plots, all of which are arranged in randomized complete blocks. The cotton is allowed to mature using normal horticultural practices, e.g. irrigation, fertilization, etc., and the crop from each plant is harvested separately and weighed. All replicates of each treatment are normalized to provide an untreated control plot value of 1.00, and the results are averaged to obtain means for each treatment. These results are reported in Table 2.

TABLE 2

| Biuret, Lb./@ | Relative Yield | Relative Yield Change, % |
|---|---|---|
| 0 | 1.00 | — |
| 5 | 1.08 | 8 |
| 10 | 0.98 | −2 |

EXAMPLE 4

The operation described in Example 3 is repeated with the exception that the biuret solutions are applied to cotton plants at squaring (just before first bloom). The crop is allowed to mature and is harvested, and the results are normalized and averaged as described in Example 3. These results are reported in Table 3.

TABLE 3

| Biuret, Lb./@ | Relative Yield | Relative Yield Change, % |
|---|---|---|
| 0 | 1.00 | — |
| 5 | 1.07 | 7 |
| 10 | 1.02 | 2 |

Again, it can be said that the 5 pound per acre biuret application rate is the most beneficial.

EXAMPLE 5

The operation described in Example 4 is repeated with the exception that three separate sets of four replicates each are treated with the described biuret-containing solutions at the described dosage rates applied at first boll set (when the first cotton boll opens). The crop is allowed to mature and is harvested, and the results are obtained and analyzed as described in Example 4. Relative means for all twelve replicates of each treatment are obtained and are reported in Table 4.

TABLE 4

| Biuret, Lb./@ | Relative Yield | Relative Yield Change, % |
|---|---|---|
| 0 | 1.00 | — |
| 5 | 1.10 | 10 |
| 10 | 1.01 | 1 |

These results demonstrate a significant increase of cotton production at a 5 pound per acre dosage rate applied at first boll set at greater than 90 percent confidence. The variation attributable to the mean relative yield change obtained for the twelve replicates treated at 10 pounds biuret per acre is greater than 1 at 90 percent confidence. Thus, it cannot be stated that the apparent increase of 1 percent is statistically significant.

EXAMPLE 6

Potatoes are foliarly treated with aqueous solutions of biuret at equivalent biuret dosage rates of 0.00, 0.625, 1.25, 2.5 and 5.00 pounds per acre of biuret when the first tubers reached golf ball size. There are four replicates of 1 milliacre for each treatment including the untreated control (dosage rate of 0.00), and the study is arranged in a randomized complete block design. The potatoes are allowed to mature under conditions of customary horticultural practice (fertilization, irrigation, etc.), are harvested, weighed, and averaged for each of the treatments to establish a mean for each treatment including the untreated control. The results are summarized in Table 5.

TABLE 5

| Biuret Rate, lb./@ | Yield Tn/@ | Percent No. 1 Grade | Yield No. 1 Grade Tn/@ | Percent Change Total Yield | Percent Change Yield No. 1 Grade |
|---|---|---|---|---|---|
| 0 | 15.15 | 40.4 | 6.12 | | |
| 0.65 | 10.65 | 34.0 | 3.62 | −30 | −49 |
| 1.25 | 13.50 | 31.8 | 4.29 | −11 | −30 |
| 2.50 | 12.00 | 36.9 | 4.42 | −21 | −28 |
| 5.00 | 12.40 | 34.6 | 4.29 | −18 | −30 |

As illustrated in the table, all biuret dosage rates significantly reduce total tuber yield as compared to the untreated control. All biuret dosage rates, at this timing, also significantly decrease the percentage of number 1 grade potatoes. Number 1 grade potatoes sell for a significantly higher price than do lower grades, and grading is based principally on potato weight, shape and color. The percentage decrease in the yield of number 1 grade potatoes ranges from 28 to 49 percent, representing a significant diminution in crop value.

EXAMPLE 7

The operation described in Example 6 is repeated with the exception that the biuret is foliarly applied two weeks prior to harvest during the maximum tuber development stage of growth. The crop is allowed to mature and is harvested as described in Example 6. The results of the study are summarized in Table 6.

TABLE 6

| Biuret Rate, lb./@ | Yield Tn/@ | Percent No. 1 Grade | Yield No. 1 Grade Tn/@ | Percent Change Total Yield | Percent Change Yield No. 1 Grade |
|---|---|---|---|---|---|
| 0 | 21.00 | 54.7 | 11.49 | | |
| 0.625 | 26.55 | 64.6 | 17.15 | 26 | 49 |
| 1.25 | 22.45 | 61.2 | 13.74 | 7 | 20 |
| 2.50 | 27.20 | 68.2 | 18.52 | 34 | 61 |
| 5.00 | 23.20 | 60.0 | 13.92 | 10 | 21 |

These results demonstrate that in every case, foliar application of biuret two weeks prior to harvest during the maximum growth stage results in a significant increase in total yield and the proportion of high quality (number 1 grade) potatoes in the crop. Total yield increases ranged from 7 to 34 percent, while the increase in the yield of number 1 grade potatoes ranged from 20 to 61 percent which represents a substantial increase in value to the grower. The results for each individual plot were evaluated statistically by analysis of variance and the increases for both total yield and the yield of number 1 grade potatoes reported in Tables 5 and 6 were determined to be statistically signficant at the 99.9 percent confidence level.

While particular embodiments of this invention have been described, it will be understood, of course, that the invention is not limited thereto since many obvious modifications can be made, and it is intended to include within this invention any such modifications as will fall within the spirit and scope of the appended claims.

I claim:

1. A method for enhancing a selected physiological response of plants other than beets and sugarbeets which comprises contacting the foliage of said plants during about the first half of the grand response period for said physiological response with a solution comprising dissolved biuret in an amount and under conditions sufficient to introduce into said plant a non-phytoltixic amount of biuret sufficient to enhance said selected response.

2. The method defined in claim 1 wherein said physiological response is selected from the group consisting of blossom set, fruit set, fruit growth, grain-head filling, root-crop development, and sugar accumulation.

3. The method defined in claim 1 wherein physiological response is other than a vegetative growth response.

4. The method defined in claim 1 wherein said solution is aqueous.

5. The method defined in claim 1 wherein said solution comprises a member selected from the group consisting of surfactants, polar solvents other than water, and combinations thereof.

6. The method defined in claim 1 wherein said plants are flowering plants, and said solution is applied to said foliage within the period between about 3 days before first bloom and about 3 days after first bloom.

7. The method defined in claim 6 wherein said solution is applied to said foliage within about 1 day of first bloom.

8. The method defined in claim 6 wherein said plants are selected from the group consisting of ornamental and fruit-bearing flowering plants.

9. The method defined in claim 1 wherein said plants comprise fruit-bearing plants, and said solution is applied to the foliage of said plants within the period between about 3 days before first fruit set and the time at which said fruit are about ½ full size.

10. The method defined in claim 9 wherein said solution is applied to the foliage of said plants at least twice during said period.

11. The method defined in claim 6 wherein said solution is applied to the foliage of said plants at least twice during said period.

12. The method defined in claim 1 wherein said solution is applied to the foliage of said plants at least twice during about the first half of said grand response period.

13. The method defined in claim 1 wherein said plants comprise grain-bearing plants, and said solution is applied to the foliage of said plants within a period of about 3 days before to about 10 days after the commencement of the grain-head filling stage of growth.

14. The method defined in claim 13 wherein said grain-bearing plants are selected from the group consisting of wheat, rice, corn, barley, oats, rye, and combinations thereof.

15. The method defined in claim 1 wherein said plants are grain-bearing plants, and said solution is applied to the foliage of said plants during about the first half of the grand response period for grain-head filling.

16. The method defined in claim 1 wherein said plants comprise root-crop plants, and said solution is applied to the foliage of said plants during about the first half of the grand growth period for the development of the harvestable portion of the roots of said plants.

17. The method defined in claim 16 wherein said plants comprise a member selected from the group consisting of potatoes, carrots, garlic, turnips, onions, peanuts, parsnips, radishes, shallots, sweet potatoes and yams.

18. The method defined in claim 9 wherein said fruit-bearing plants comprise a member selected from the group consisting of stone fruits, small fruits, pome fruits, citrus, nuts, and fruiting vegetables.

19. The method defined in claim 1 wherein said plants comprise cotton plants, and said solution is contacted with the foliage of said cotton plants within a period defined by about 3 days before to about 10 days after first boll set.

20. The method defined in claim 1 wherein said plants comprise cotton plants, and said solution is contacted with the foliage of said plants within the first half of the grand response period for boll growth on said plants.

21. The method defined in claim 1 wherein said plants comprise a member selected from the group consisting of vegetative forage plants, and said solution is contacted with the foliage of said plants during about the first half of the grand growth period of said plants.

22. The method defined in claim 21 wherein said forage plants comprise a member selected from the group consisting of alfalfa, hay, and combinations thereof.

23. The method defined in claim 22 wherein said forage plants are periodically harvested by cutting and are allowed to re-grow after cutting, and said solution is applied to the foliage of the re-growing plants within a period of about 2 to about 10 days after said cutting.

24. The method defined in claim 1 wherein said plants comprise a member selected from the group consisting of seed and pod vegetables, and said solution is applied to the foliage of said plants during about the first half of the grand growth period of the seeds or pods of said plants.

25. The method defined in claim 1 wherein said plants comprise a member selected from the group consisting of deciduous trees, shrubs and vines, and said solution is applied to the foliage of said plants in the spring within the period from about first leaf emergence to about 2 weeks after first leaf emergence.

26. The method defined in claim 1 wherein said plants comprise sugar-producing plants selected from the group consisting of sugarcane, and fruiting plants, and said solution is applied to the foliage of said plants after the beginning of the sugar accumulation cycle in said plants and before said sugar accumulation cycle is about ½ complete.

27. The method defined in claim 26 wherein said solution is applied to the foliage of said plants at a rate corresponding to about 1 ounce to about 30 pounds of biuret per acre, and the biuret/urea weight ratio in said solution is at least 0.5.

28. The method defined in claim 27 wherein said solution is applied to the foliage of said plants at a rate corresponding to about 1 ounce to about 10 pounds of biuret per acre, and said plants comprise a member selected from the group consisting of citrus, pome fruits and small fruits.

29. The method defined in claim 1 wherein said solution is applied to the foliage of said plants at a rate corresponding to about 1 ounce to about 30 pounds of biuret per acre, and the biuret/urea weight ratio in said solution is at least about 0.02.

30. The method defined in claim 1 wherein said solution is applied to the foliage of said plants at a rate corresponding to about 1 ounce to about 10 pounds of biuret per acre, and the biuret/urea weight ratio in said solution is at least about 0.05.

31. The method defined in claim 1 wherein said solution is applied to the foliage of said plants at a rate corresponding to about 1 ounce to about 5 pounds of biuret per acre, and the biuret/urea weight ratio in said solution is at least about 0.05.

32. The method defined in claim 1 wherein said solution is applied to the foliage of said plants at a rate corresponding to about 1 ounce to about 20 pounds of biuret per acre, and the biuret/urea weight ratio in said solution is at least about 0.1.

33. The method defined in claim 1 wherein said solution is applied to the foliage of said plants at a rate corresponding to at least about 1 ounce of biuret per acre, and the biuret/urea weight ratio in said solution is at least about 0.5.

34. The method defined in claim 33 wherein the nitrogen content of said solution consists essentially of biuret.

35. The method defined in claim 1 wherein said plants comprise flowering-fruiting plants, and said solution is applied to the foliage of said plants within the period of about 3 days before to about 3 days after first bloom and again within a period of about 3 days before to about 1 week after fruit set.

36. A method for enhancing the flower set of flowering plants which comprises contacting the foliage of said plants during about the first half of the blossom-set period for said plants with a solution comprising dissolved biuret in an amount and under conditions sufficient to introduce into said plant a non-phytotoxic amount of biuret sufficient to enhance the blossom set of said plants.

37. The method defined in claim 36 wherein said solution is applied to the foliage of said plants within a period of about 3 days before first bloom to about 3 days after first bloom, said plants comprise a member selected from the group consisting of ornamental and fruit-bearing flowering plants, said solution is applied to the foliage of said plants at a rate corresponding to at least about 1 ounce of biuret per acre, and the biuret-/urea weight ratio in said solution is at least about 0.05.

38. A method for enhancing the fruit set of fruit-bearing plants which comprises contacting the foliage of said plants during about the first half of the fruit-set period for said plants with a solution comprising dissolved biuret in an amount and under conditions sufficient to introduce into said plants a non-phytotoxic amount of biuret sufficient to enhance the fruit-set of said plants, wherein said solution is applied to the foliage of said plants at a rate corresponding to at least about 1 ounce of biuret per acre, and the biuret/urea weight ratio in said solution is at least about 0.1.

39. A method for enhancing the grain production of grain-bearing plants which comprises contacting the foliage of said plants during the first half of the grain-head filling period for said plants with a solution comprising dissolved biuret in an amount and under conditions sufficient to introduce into said plants a non-phytotoxic amount of biuret sufficient to enhance the grain production of said plants, wherein said solution is applied to the foliage of said plants at a rate corresponding to at least about 1 ounce of biuret per acre, and the biuret/urea weight ratio in said solution is at least about 0.1.

40. A method for enhancing the production of harvestable root parts by root crops selected from the group consisting of potatoes, carrots, garlic, turnips, onions, peanuts, parsnips, radishes, shallots and yams which comprises contacting the foliage of said root crops during about the first half of the grand growth period for the development of the harvestable root parts of said root crops with a solution comprising dissolved biuret in an amount and under conditions sufficient to introduce into said root crops a non-phytotoxic amount of biuret sufficient to enhance the production of said harvestable root parts, wherein said solution is applied to the foliage of said root crops at a rate corresponding to at least about 1 ounce of biuret per acre, and the biuret/urea weight ratio in said solution is at least about 0.1.

41. A method for enhancing the cotton production of cotton plants which comprises contacting the foliage of said plants during about the first half of the blossom-set period for said plants with a solution comprising dissolved biuret in an amount and under conditions sufficient to introduce into said plants a non-phytotoxic amount of biuret, wherein said solution is applied to the foliage of said plants at a rate corresponding to at least about 1 ounce of biuret per acre, and the biuret/urea weight ratio in said solution is at least about 0.05.

42. A method for enhancing the cotton production of cotton plants which comprises contacting the foliage of said plants during about the first half of the boll-set period for said plants with a solution comprising dissolved biuret in an amount and under conditions sufficient to introduce into said plants a non-phytotoxic amount of biuret, wherein said solution is applied to the foliage of said plants at a rate corresponding to at least 1 ounce of biuret per acre, and the biuret/urea weight ratio in said solution is at least about 0.05.

43. A method for enhancing the cotton production of cotton plants which comprises contacting the foliage of said plants during about the first half of the grand growth period for cotton boll growth on said plants with a solution comprising dissolved biuret in an amount and under conditions sufficient to introduce into said plants a non-phytotoxic amount of biuret, wherein said solution is applied to the foliage of said plants at a rate corresponding to at least about 1 ounce of biuret per acre, and the biuret/urea weight ratio in said solution is at least about 0.05.

44. A method for enhancing the sugar production of sugar producing plants selected from the group consisting of sugarcane, and fruiting plants, which comprises contacting the foliage of said plants during about the first half of the sugar accumulation period in said plants with a solution comprising dissolved biuret in an amount and under conditions sufficient to introduce into said plants a non-phytotoxic amount of biuret, wherein said solution is applied to the foliage of said plants at a rate corresponding to at least about 1 ounce of biuret per acre, and the biuret/urea weight ratio in said solution is at least about 0.05.

45. The method defined in claim 44 wherein said plants are selected from the group consisting of stone fruits, small fruits, pome fruits, citrus, nuts, and fruiting vegetables.

46. The method defined in claim 36 wherein said solution is essentially free of urea.

47. The method defined in claim 38 wherein said solution is essentially free of urea.

48. The method defined in claim 39 wherein said solution is essentially free of urea.

49. The method defined in claim 40 wherein said solution is essentially free of urea.

50. The method defined in claim 41 wherein said solution is essentially free of urea.

51. The method defined in claim 42 wherein said solution is essentially free of urea.

52. The method defined in claim 44 wherein said solution is essentially free of urea.

53. A method for enhancing a physiological response selected from the group consisting of blossom set, fruit set, fruit growth, grain-head filling, root-crop developement, sugar accumulation, and combinations thereof, of plants selected from the group consisting of flowering plants, fruiting plants, fruiting vegetables, seed and pod vegetables, nut crops, grain-bearing plants, carrots, chicory, garlic, onions, parsnips, potatoes, radishes, rutabagas, salsify, shallots, turnips and yams, which comprises contacting the foliage of said plants during about the first half of the grand response period for said physiological response with a solution comprising dissolved biuret in an amount and under conditions sufficient to introduce into said plants a non-phytotoxic amount of biuret sufficient to enhance said physiological response, wherein the biuret/urea weight ratio in said solution is at least about 0.5.

54. The method defined in claim 53 wherein said solution is essentially free of urea.

* * * * *